US008564883B2

(12) United States Patent
Totani et al.

(10) Patent No.: US 8,564,883 B2
(45) Date of Patent: Oct. 22, 2013

(54) VIRTUAL IMAGE DISPLAY DEVICE

(75) Inventors: Takahiro Totani, Suwa (JP); Masayuki Takagi, Shiojiri (JP); Toshiaki Miyao, Matsumoto (JP); Akira Komatsu, Kamiina-gun (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/363,732

(22) Filed: Feb. 1, 2012

(65) Prior Publication Data
US 2012/0200938 A1 Aug. 9, 2012

(30) Foreign Application Priority Data
Feb. 4, 2011 (JP) ................. 2011-022442

(51) Int. Cl.
*G02B 27/14* (2006.01)
*G02B 27/01* (2006.01)
(52) U.S. Cl.
CPC .................. *G02B 27/0172* (2013.01)
USPC ................. 359/633; 359/630; 345/8
(58) Field of Classification Search
USPC ......... 359/630, 632, 633; 345/7, 8, 9
See application file for complete search history.

(56) References Cited

U.S. PATENT DOCUMENTS

| 7,944,616 B2 | 5/2011 | Mukawa |
| 8,052,308 B2 | 11/2011 | Kamijima |
| 2001/0010598 A1 | 8/2001 | Aritake et al. |
| 2006/0087755 A1* | 4/2006 | Richard ............ 359/883 |
| 2007/0047091 A1 | 3/2007 | Spitzer et al. |
| 2007/0058261 A1 | 3/2007 | Sugihara et al. |
| 2010/0103078 A1* | 4/2010 | Mukawa et al. ......... 345/8 |
| 2010/0245211 A1 | 9/2010 | Iba et al. |
| 2012/0200935 A1 | 8/2012 | Miyao et al. |
| 2012/0200936 A1 | 8/2012 | Takagi et al. |
| 2012/0200937 A1 | 8/2012 | Totani et al. |
| 2012/0206817 A1 | 8/2012 | Totani et al. |

FOREIGN PATENT DOCUMENTS

| JP | A-2006-003879 | 1/2006 |
| JP | A-2008-535001 | 8/2008 |
| JP | A-2010-224473 | 10/2010 |

OTHER PUBLICATIONS

Jan. 29, 2013 Office Action issued in U.S. Appl. No. 13/357,205.
Jun. 20, 2013 Office Action issued in U.S. Appl. No. 13/353,641.
Jul. 23, 2013 Office Action issued in U.S. Appl. No. 13/355,893.

* cited by examiner

*Primary Examiner* — Ricky Mack
*Assistant Examiner* — Gary O'Neill
(74) *Attorney, Agent, or Firm* — Oliff & Berridge, PLC

(57) ABSTRACT

Image light reflected by a third reflective surface of a light incidence portion is propagated while being totally reflected by first and second reflective surfaces of a light guiding portion, is reflected by a fourth reflective surface of a light emission portion, and is incident to observer's eye as a virtual image. At this time, the number of times of reflection of first image light, which is emitted from a first partial region of an image display device, in the light guiding portion, and the number of times of reflection of second image light, which is emitted from a second partial region of the image display device in the light guiding portion are different from each other, such that it is possible to take in the image light beams from the different partial regions of the image display device with a relatively wide angle of view.

17 Claims, 8 Drawing Sheets

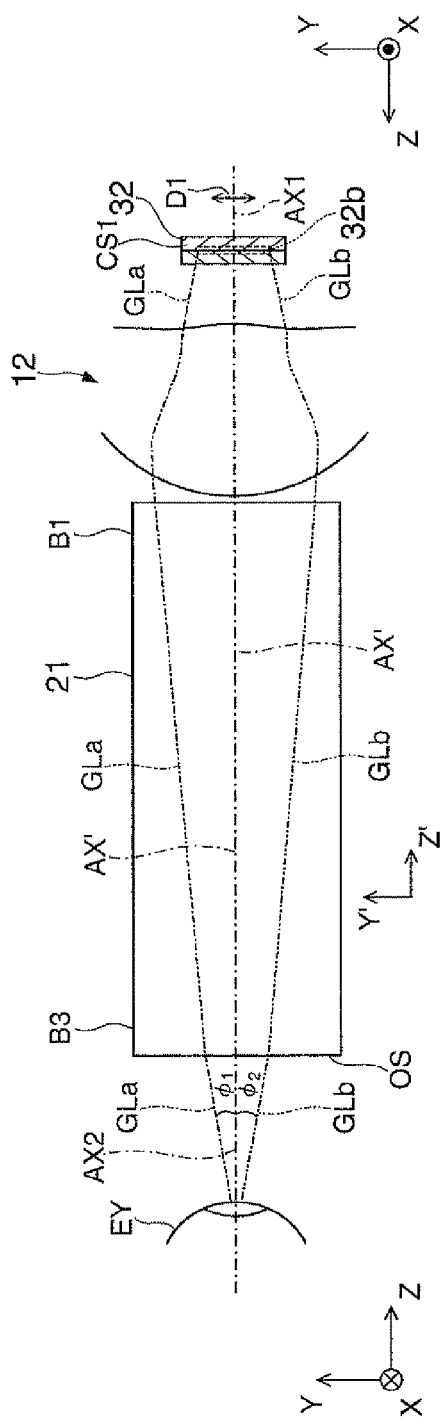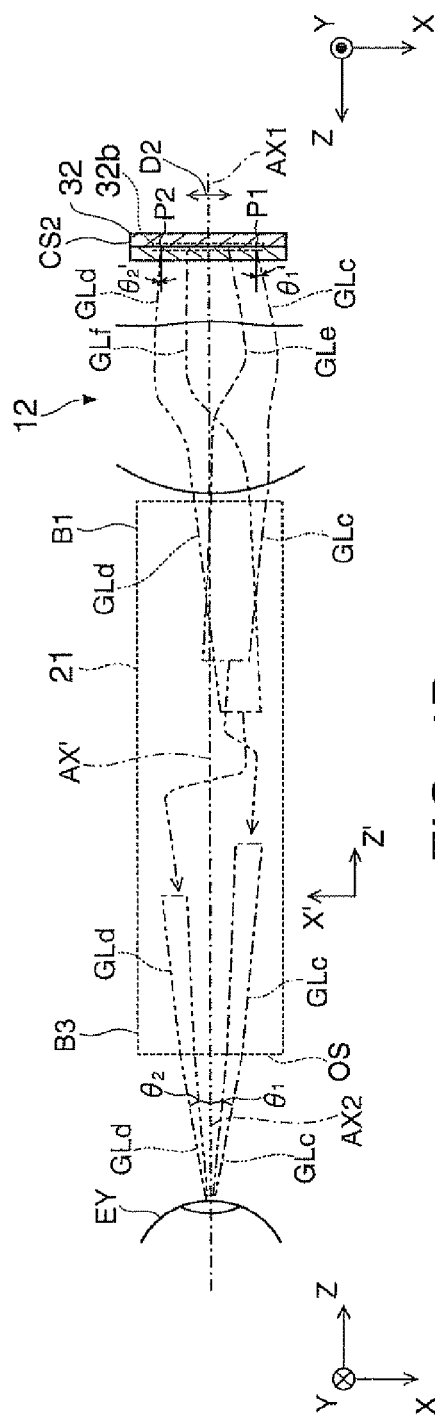

VIRTUAL IMAGE DISPLAY DEVICE

This Application claims priority to JP 2011-022442 filed in Japan on Feb. 4, 2011, the entire disclosure of which is herein incorporated by reference in its entirety.

BACKGROUND

1. Technical Field

The present invention relates to a virtual image display device such as a head-mounted display that is used by being mounted on the head.

2. Related Art

In recent years, as a virtual image display device that allows a virtual image to be formed and to be observed similarly to the head-mounted display, various virtual image display devices of a type in which image light from a display element is guided to a pupil of an observer by a light guiding plate have been suggested.

In this virtual image display device, in order that the image light and external light overlap each other, a see-through optical system has been suggested (refer to JP-A-2006-3879 and JP-A-2010-224473).

However, in the device disclosed in JP-A-2006-3879 or the like, the see-through state is realized by a pupil division method that uses a light guiding optical system in which an emission opening is smaller than a pupil size, such that it is difficult to make a display size of the virtual image large. In addition, a light guiding optical system that is smaller than the size of the pupil is used, such that it is difficult to make an effective pupil diameter (a lighting diameter that allows the virtual image to be taken in, and is called an Eyring diameter) large so as to correspond to an individual pupil width in humans. In addition, the emission opening or a casing of the light guiding optical system is physically disposed in the vicinity of the pupil, such that a blind spot is generated, and therefore it is not necessarily perfectly see-through.

In addition, as an optical system for the head-mounted display, an optical system including a light guiding pipe that allows a plurality of light modes in which the light guiding angles are different from each other to progress (refer to JP-A-2008-535001) is disclosed. In this optical system, a liquid crystal panel is illuminated with collimated light in which a different angle of incidence is set for each of the optical modes on the assumption that a phase of each of the plurality of optical modes is misaligned. In addition, display content is changed by each optical mode, and a display of each optical mode is sequentially performed, and thereby an image of each optical mode is connected to obtain an entire image. In this case, it is necessary to display a center image and left and right images, which make up the entire image while they are changed at a time interval by one liquid crystal panel, such that a virtual image display device becomes complex and an observed image becomes dark.

SUMMARY

An advantage of some aspects of the invention is to provide a virtual image display device that can make a display size of a virtual image large with a simple configuration, can secure a large Eyring diameter, and thereby can realize a preferable see-through observation.

An aspect of the invention is directed to a virtual image display device including (a) an image display device that forms image light; (b) a projective optical system that allows the image light emitted from the image display device to be incident; and (c) a light guiding member that includes a light guiding portion, a light incidence portion that allows the image light to be incident to the light guiding portion, and a light emission portion that emits the image light guided by the light guiding portion to the outside, and that makes the image light visible through the light emission portion, in which (d) the light guiding portion has a first reflective surface and a second reflective surface that are disposed in parallel with each other and allow the image light to be guided through a total reflection, (e) the light incidence portion has a third reflective surface that makes a predetermined angle with respect to the first reflective surface, (f) the light emission portion has a fourth reflective surface that makes a predetermined angle with respect to the first reflective surface, and (g) the image light from the image display device is guided into the light guiding member with the number of times of reflection that is different in each image light beam, and a plurality of image light beams formed in correspondence with the number of times of reflection are combined through the light emission portion and are emitted to the outside. At this time, the plurality of image light beams formed in correspondence with the number of times of reflection are taken out to the outside while forming one virtual image that is partially overlapped.

According to the virtual image display device, the image light reflected by the third reflective surface of the light incidence portion is propagated while being totally reflected by the first and second reflective surfaces of the light guiding portion, is reflected by the fourth reflective surface of the light emission portion, and is incident to the observer's eye as a virtual image. At this time, the image light from the image display device is guided in the light guiding member with the number of times of reflection that is different in each image light beam, such that it is possible to take a wide angle width of an angle of emission of the image light emitted from the light emission portion. That is, image light beams, which are emitted from the image display device and in which the number of times of reflection in the light guiding member is different in each of the image light beams, are combined and are taken out as image light that forms one virtual image partially overlapping, such that it is possible to secure a large display size of a virtual image that is observed over the light emission portion. In this way, due to the setting of a structure in which image light beams in which the number of times of reflection is different in each image light beam are taken out, it is possible to make the light emission portion large so as to cover a pupil without making the light guiding portion too much thicker, and therefore it is not necessary to perform a pupil division by making the light emission portion close to the pupil. As a result, it is possible to secure a large Eyring diameter and thereby a preferable see-through observation may be realized.

In addition, in the virtual image display device, the image light from the image display device is guided in the light guiding member with the number of times of reflection that is different in each image light beam, and a plurality of image light beams formed in correspondence with the number of times of reflection are combined simultaneously through the light emission portion and are emitted to the outside, such that it is possible to take out the image light as image light that forms one virtual image.

Another aspect of the invention is directed to a virtual image display device including (a) an image display device that forms image light; (b) a projective optical system that allows the image light emitted from the image display device to be incident; and (c) a light guiding member that includes a light guiding portion, a light incidence portion that allows the image light to be incident to the light guiding portion, and a light emission portion that emits the image light guided by the light guiding portion to the outside, and that makes the image light visible through the light emission portion, in which (d) the light guiding portion has a first reflective surface and a second reflective surface that are disposed in parallel with each other and allow light to be guided through a total reflection, (e) the light incidence portion has a third reflective surface that makes a predetermined angle with respect to the first reflective surface, (f) the light emission portion has a fourth reflective surface that makes a predetermined angle with respect to the first reflective surface, and (g) the number of times of reflection of first image light, which is emitted from a first partial region of the image display device, in the light guiding portion, and the number of times of reflection of second image light, which is emitted from a second partial region different from the first partial region in regard to a confinement direction in which a return of an optical path due to reflection occurs at the time of light-guiding, in the light guiding portion are different from each other.

According to the virtual image display device, the image light reflected by the third reflective surface of the light incidence portion is propagated while being totally reflected by the first and second reflective surfaces of the light guiding portion, is reflected by the fourth reflective surface of the light emission portion, and is incident to the observer's eye as a virtual image. At this time, the number of times of reflection of first image light, which is emitted from the first partial region of the image display device, in the light guiding portion, and the number of times of reflection of second image light, which is emitted from a separate second partial region of the image display device, in the light guiding portion are different from each other, such that it is possible to take a wide angle width of an angle of emission of the image light emitted from the light emission portion. That is, it is possible to take in the image light from the different partial regions in the image display device at a relatively wide angle of view, such that it is possible to secure a large display size of a virtual image that is observed over the light emission portion. In this way, due to the setting of a structure in which image light beams in which the number of times of reflection is different in each image light beam are taken out, it is possible to make the light emission portion large so as to cover a pupil without making the light guiding portion too much thicker, and therefore it is not necessary to perform a pupil division by making the light emission portion close to the pupil. As a result, it is possible to secure a large Eyring diameter and thereby a preferable see-through observation may be realized.

In a specific aspect of the invention, the virtual image display device may be configured such that the confinement direction is a direction that is parallel with a cross-section including a first optical axis passing through the projective optical system and a normal line of the third reflective surface. In the image light beams from different positions in regard to the confinement direction, angles of emission, that is, angles of incidence to the light incidence portion are made to be different from each other, such that it is possible to make the numbers of times of reflection in the light guiding portion different from each other.

In still another aspect of the invention, the virtual image display device may be configured such that the third reflective surface and the fourth reflective surface make an acute angle of 45° or less with respect to the first reflective surface, respectively. In this case, it is possible to allow the image light from the first reflective surface side to be incident and allow the image light to be emitted to the first reflective surface side, such that it is easy to make the virtual image display device as a virtual image display device having an external appearance of eyeglasses-type. In addition, a gap between the first reflective surface and the second reflective surface may be made to be narrow and the light guiding portion may be made to be thin, such that it is possible to realize weight reduction of the light guiding portion or the like.

In yet another aspect of the invention, the virtual image display device may be configured such that the third reflective surface and the fourth reflective surface make the same angle with respect to the first reflective surface. In this case, it is possible to emit an image formed by the image display device from the light emission portion without distortion, and it is possible to make the image display device or projective optical system simple.

In still yet another aspect of the invention, the virtual image display device may be configured such that the first optical axis passing through the projective optical system and a second optical axis of the image light emitted from the light emission portion are parallel with a normal line of the first reflective surface, respectively. According to this configuration, an optical system becomes simple, and it is possible to make the optical system have high accuracy.

In further another aspect of the invention, the virtual image display device may be configured such that the light guiding member including the light guiding portion, the light incidence portion, and the light emission portion is a member of a block state, which is integrally formed. According to this configuration, a disposition relationship of the first to fourth reflective surfaces is accurately maintained, and thereby it is possible to make adjustment of the disposition relationship unnecessary and it becomes easy to assemble these reflective surfaces in the virtual image display device.

In still further another aspect of the invention, the virtual image display device may be configured such that the light guiding member has the first to fourth reflective surfaces as a side surface, and a top surface and a bottom surface that are adjacent to the first to fourth reflective surfaces, respectively.

In yet further another aspect of the invention, the virtual image display device may be configured such that the light guiding member is an external form of a polyhedral shape having at least one of a first end surface provided by removing a corner between the first reflective surface and the third reflective surface and a second end surface provided by removing a corner between the first reflective surface and the fourth reflective surface. A periphery of each corner of both end portions of the first reflective surface has a tendency of forming a ghost image, such that when the first end surface or the second end surface is provided by removing the corner, it is possible to suppress the formation of the ghost image.

In still yet further another aspect of the invention, the virtual image display device may be configured such that the light guiding member is integrally molded through injection molding. In this case, it is possible to produce the light guiding member with high accuracy using an injection molding technique.

In a further aspect of the invention, the virtual image display device may be configured such that the light guiding member is molded from a thermal polymerization type resin material. In this case, it is possible to increase weight reduction or safety due to the resin, and thereby a stable and highly accurate molding due to thermosetting may be realized.

In a still further aspect of the invention, the virtual image display device may be configured such that the light guiding member is provided with a hard coat on the first reflective surface and the second reflective surface. In this case, it is possible to increase durability of the first reflective surface or the second reflective surface of the light guiding member.

In a yet further aspect of the invention, the virtual image display device may be configured to further include a wedge-shaped light transmitting member that has a transmissive surface that is opposite to the fourth reflective surface, and a half mirror is provided on the fourth reflective surface. According to this configuration, it is possible to guide external light to a pupil through the fourth reflective surface and the light transmitting member, and thereby a natural observation of the outside may be realized.

In a still yet further aspect of the invention, the virtual image display device may be configured such that transmittance of the half mirror is adjusted by controlling a film thickness of an Ag film. The Ag film can form a half mirror in which absorption is small and efficiency is high. In addition, the Ag film has lower sensitivity of transmittance with respect to an increase or a decrease in a film thickness compared to the case of the Al film or the like, such that it is easy to adjust the reflectance or the transmittance of the half mirror.

In a furthermore aspect of the invention, the virtual image display device may be configured such that the third reflective surface is provided with a total reflection coating. In this case, it is possible to reduce loss in an amount of light in the third reflective surface.

BRIEF DESCRIPTION OF THE DRAWINGS

The invention will be described with reference to the accompanying drawings, wherein like numbers reference like elements.

FIG. 4A is a conceptual diagram in which an optical path in relation to a first vertical direction is developed, and FIG. 4B is a conceptual diagram in which an optical path in relation to a second horizontal direction is developed;

FIG. 9 is a diagram illustrating a modification of the light guiding member shown in FIG. 2A or the like.

DESCRIPTION OF EXEMPLARY EMBODIMENTS

Hereinafter, a virtual image display device related to an embodiment of the invention will be described in detail with reference to the accompanying drawings.

A. External Appearance of Virtual Image Display Device

Figure 1:
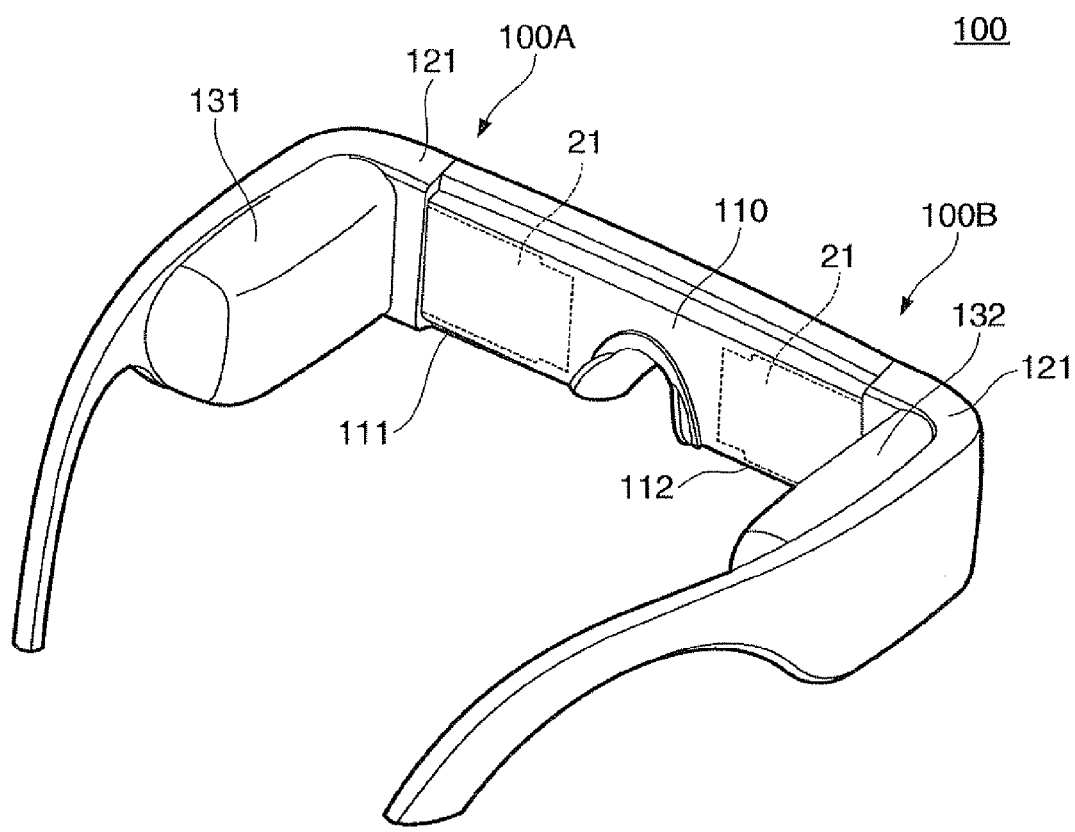
FIG. 1 is a perspective view illustrating a virtual image display device of an embodiment.

A virtual image display device 100 of an embodiment illustrated in FIG. 1 is a head-mounted display having the same external appearance as eyeglasses, and allows an observer wearing this virtual image display device 100 to perceive image light via a virtual image and allows the observer to observe an external image in a see-through manner. The virtual image display device 100 includes an optical panel 110 that covers the front of the observer's eyes, a frame 121 that maintains the optical panel 110, and first and second driving portions 131 and 132 that are provided at a portion ranging from end-piece to temple of the frame 121. Here, the optical panel 110 includes a first panel portion 111 and a second panel portion 112, and both panel portions 111 and 112 are formed of a plate-shaped part and are integrally connected at the center of the optical panel 110. A first display device 100A including the first panel portion 111 and the first driving portion 131 at the left-side in the drawing is a portion that forms a left-eye virtual image, and also functions independently as a virtual image display device. In addition, a second display device 100B including the second panel portion 112 and the second driving portion 132 at the right-side in the drawing is a portion that forms a right-eye virtual image, and also functions independently as a virtual image display device.

B. Structure of Display Device

Figure 2A:
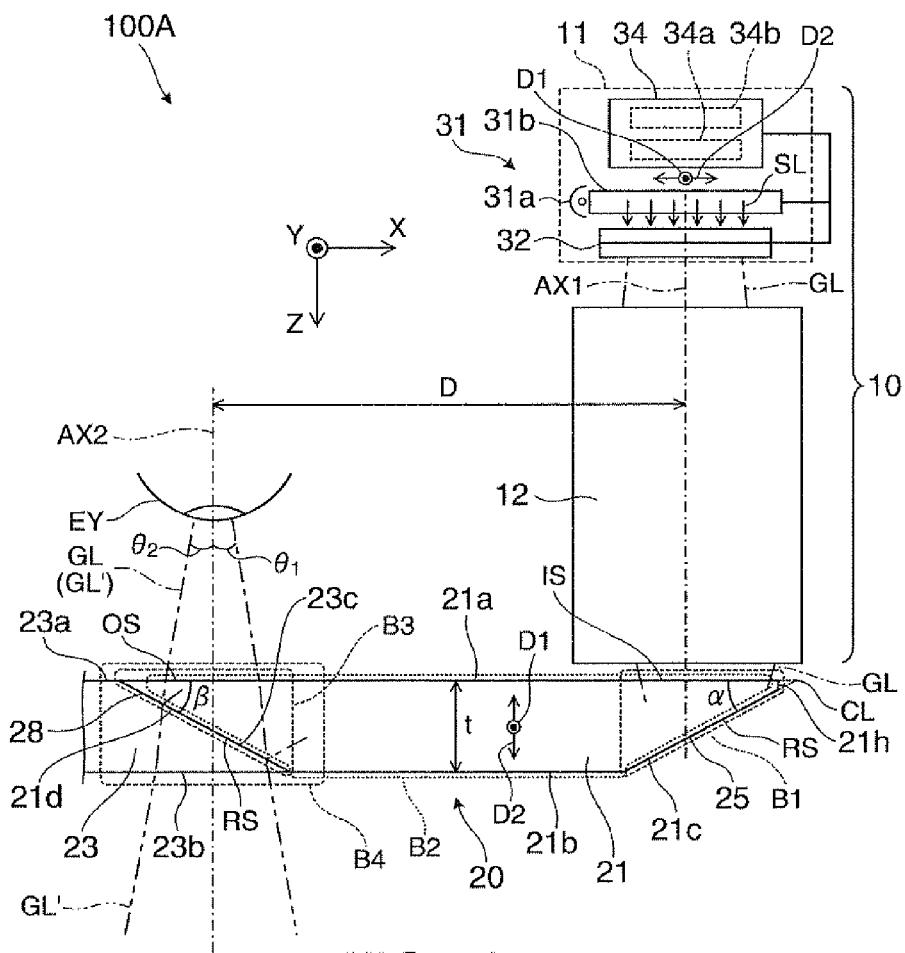
FIG. 2A is a plan view of a main body portion of a first display device making up the virtual image display device.
Figure 2B:
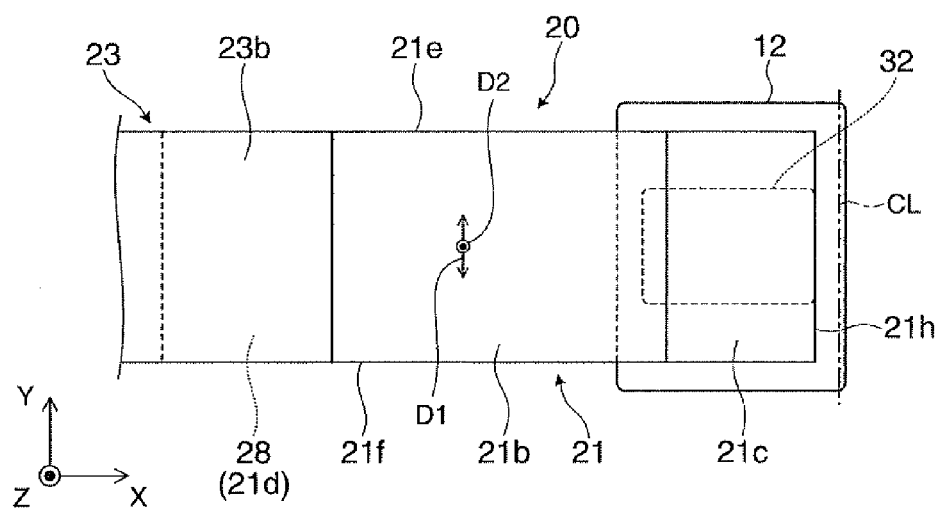
FIG. 2B is a front elevation view of the main body portion.

As shown in FIG. 2A or the like, the first display device 100A includes an image forming device 10 and a light guiding device 20. Here, the image forming device 10 corresponds to the first driving portion 131 in FIG. 1, and the light guiding device 20 corresponds to the first panel portion 111 in FIG. 1. In addition, the second display device 100B shown in FIG. 1 has the same structure as the first display device 100A except that the left and right are reversed, such that the detailed description of the second display device 100B will not be repeated.

The image forming device 10 includes an image display device 11 and a projective optical system 12. The image display device 11 includes an illumination device 31 that emits two-dimensional illumination light SL, a liquid crystal display device 32 that is a transmission-type spatial optical modulation device, and a driving control unit 34 that controls an operation of the illumination device 31 and the liquid crystal display device 32.

The illumination device 31 includes a light source 31a that generates light including three colors of red, green, and blue, and a backlight light-guiding portion 31b that diffuses the light from the light source 31a and converts this light into a light beam having a rectangular cross-section. The liquid crystal display device 32 spatially modulates illumination light SL emitted from the illumination device 31 and forms image light, which is an object to be displayed, such as a moving picture. The driving control unit 34 includes a light source driving circuit 34a and a liquid crystal driving circuit 34b. The light source driving circuit 34a supplies power to the light source 31a of the illumination device 31 and allows the illumination light SL with a stable brightness to be emitted. The liquid crystal driving circuit 34b outputs an image signal or a driving signal to the liquid crystal display device 32, and forms colored-image light that becomes an origin of the moving picture or a still image as a transmittance pattern. In addition, the liquid crystal driving circuit 34b may be provided with an image processing function, but the image processing function may be provided to a control circuit that is externally provided. The projective optical system 12 is a collimated lens that converts image light emitted from each point on the liquid crystal display device 32 into a parallel light beam.

In the liquid crystal display device 32, a first direction D1 corresponds to an extension direction of a vertical cross-section including a first optical axis AX1 passing through the projective optical system 12 and a specific line parallel with a third reflective surface 21c of the light guiding member 21, which is described later, and a second direction D2 corresponds to an extension direction of a horizontal cross-section including the first optical axis AX1 and a normal line of the third reflective surface 21c. In other words, the first direction D1 is a direction parallel with an intersection line CL between a first reflective surface 21a of the light guiding member 21, which is described later, and the third reflective surface 21c, and the second direction D2 is a direction parallel with a plane of the first reflective surface 21a and is orthogonal to the intersection line CL between the first reflective surface 21a and the third reflective surface 21c. That is, in regard to a position of the liquid crystal display device 32, the first direction D1 corresponds to a vertical Y-direction and the second direction D2 corresponds to a horizontal X-direction.

In addition, in regard to an effective size, the liquid crystal display device 32 has a horizontally long shape, that is, a length in the second direction D2 is larger than a length in the first direction D1. On the other hand, an emission opening width of the projective optical system 12 has a vertically long shape, that is, a width in the first direction D1 is larger than a width in the second direction D2.

The light guiding device 20 is formed by bonding the light guiding member 21 and a light transmitting member 23, and makes up an optical member having a flat plate shape that extends in parallel with an XY plane, as a whole.

In the light guiding device 20, the light guiding member 21 is a trapezoidal prism-shaped member in a plan view, has a first reflective surface 21a, a second reflective surface 21b, a third reflective surface 21c, and a fourth reflective surface 21d as a side surface. In addition, the light guiding member 21 has a top surface 21e and a bottom surface 21f that are adjacent to the first, second, third, and fourth reflective surfaces 21a, 21b, 21c, and 21d, and are opposite to each other. Here, the first and second reflective surfaces 21a and 21b extend along the XY plane and are separated from each other by a thickness t of the light guiding member 21. In addition, the third reflective surface 21c is inclined at an acute angle α of 45° or less with respect to the XY plane, and the fourth reflective surface 21d is inclined, for example, at an acute angle β of 45° or less with respect to the XY plane. The first optical axis AX1 passing through the third reflective surface 21c and a second optical axis AX2 passing through the fourth reflective surface 21d are disposed in parallel with each other and are separated from each other by a distance D. In addition, as will be described later in detail, a corner is removed and thereby an end surface 21h is formed between the first reflective surface 21a and the third reflective surface 21c. When including this end surface 21h, the light guiding member 21 has an external form of a polyhedral shape with seven faces.

The light guiding member 21 performs the light guiding using a total reflection by the first and second reflective surfaces 21a and 21b. There are two directions, that is, a direction that is turned back by the reflection at the time of light-guiding, and a direction that is not turned back by the reflection at the time of light-guiding. When it is considered in relation to an image guided by the light guiding member 21, a horizontal direction that is turned back by plural times of reflection at the time of light-guiding, that is, a confinement direction corresponds to the second direction D2 of the liquid crystal display device 32 when an optical path is developed to the light source side orthogonal to the first and second reflective surfaces 21a and 21b (in parallel with the Z-axis) as described later, a vertical direction that is not turned back by the reflection at the time of light-guiding, that is, a free propagation direction corresponds to the first direction D1 of the liquid crystal display device 32 when an optical path is developed to the light source side in parallel with the first and second reflective surfaces 21a and 21b, and the third reflective surface 21c (in parallel with the Y-axis) as described later.

The light guiding member 21 is formed of a resin material showing a high light transmitting property at a visible range. The light guiding member 21 is a member of a block state, which is integrally molded by injection molding, and is formed, for example, by injecting a thermal polymerization-type resin material into a metal mold and by thermally curing this molded resin material. In this way, the light guiding member 21 is an integrally formed product, but functionally, may be considered as being classified into a light incidence portion B1, a light guiding portion B2, and a light emission portion B3.

Figure 3A:
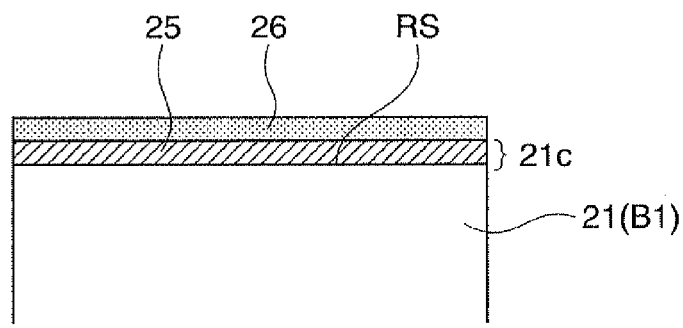
FIG. 3A is a diagram illustrating a structure of a third reflective surface in a light incidence portion of a light guiding member.

The light incidence portion B1 is a triangular prism-shaped portion and has a light incidence surface IS that is a part of the first reflective surface 21a, and the third reflective surface 21c opposite to the light incidence surface IS. The light incidence surface IS is a rear-side or observer-side plane for taking in image light GL from the image forming device 10, and extends in a direction orthogonal to the first optical axis AX1 and opposite to the projective optical system 12. The third reflective surface 21c is a rectangular total reflection mirror that reflects the image light GL passed through the light incidence surface IS and guides this reflected image light GL into the light guiding portion B2, has a mirror layer 25, and is coated with a protective layer 26 (refer to FIG. 3A). This mirror layer 25 is a total reflection coating and is formed by forming a film through a vapor deposition of aluminum or the like on an inclined surface RS of the light guiding member 21. The third reflective surface 21c is inclined with respect to the first optical axis AX1 of the projective optical system 12 or the XY plane, for example, at an acute angle α of 25° to 27°, and turns back the image light GL that is incident from the light incidence surface IS and faces a positive Z-direction as a whole, in order for the image light GL to face a negative X-direction close to a negative Z-direction as a whole, such that the image light GL may be reliably guided into the light guiding portion B2.

Figure 3B:
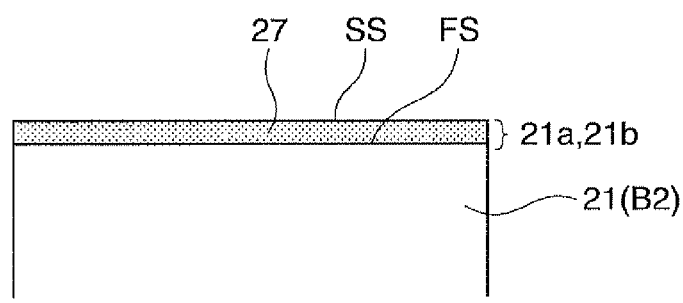
FIG. 3B is a diagram illustrating a structure of a first reflective surface and a second reflective surface in a light guiding portion of the light guiding member.

The light guiding portion B2 has the first reflective surface 21a and the second reflective surface 21b, which totally reflect the image light turned back by the light incidence portion B1, as two planes that extend in parallel with the XY plane and opposite to each other. A distance between the first and second reflective surfaces 21a and 21b, that is, a thickness t of the light guiding member 21 is set to, for example, substantially 9 mm. Here, it is assumed that the first reflective surface 21a is at a rear side or an observer side that is close to the image forming device 10, and the second reflective surface 21b is at a front side or external side that is distant from the image forming device 10. In this case, the first reflective surface 21a is a plane portion that is common to the light incidence surface IS described above or a light emission surface OS described later. The first and second reflective surfaces 21a and 21b are total reflection surfaces using a difference in refraction indexes, and to which a reflective coat such as a mirror layer is not provided. The first and second reflective surfaces 21a and 21b are coated with a hard coat layer 27 to prevent surface damage and thereby to prevent deterioration in the resolution of a video (refer to FIG. 3B).

This hard coat layer 27 is formed by forming a film through a dipping process or a spray coating process of a UV-curable resin, a thermosetting resin, or the like on a flat surface FS of the light guiding member 21. The image light GL reflected by the third reflective surface 21c of the light incidence portion B1 is, first, incident to the first reflective surface 21a and is totally reflected. Next, the image light GL is incident to the second reflective surface 21b and is totally reflected. Next, these operations are repeated, and thereby the image light is guided to an internal side of the light guiding device 20, that is, a negative X side in which the light emission portion B3 is provided. In addition, a reflective coat is not provided to the first and second reflective surfaces 21a and 21b, such that external light that is incident to the second reflective surface 21b from the external side passes through the light guiding portion B2 with a high transmittance. That is, the light guiding portion B2 is formed of a see-through type in which the see-through of an external image is possible.

The above-described total reflection at the first and second reflective surfaces 21a and 21b may be made to occur at an inner side of a surface SS of the hard coat layer 27 through a setting of a refractive index of the hard coat layer 27, but may be made to occur at an inner side of the flat surface FS.

Figure 3C:
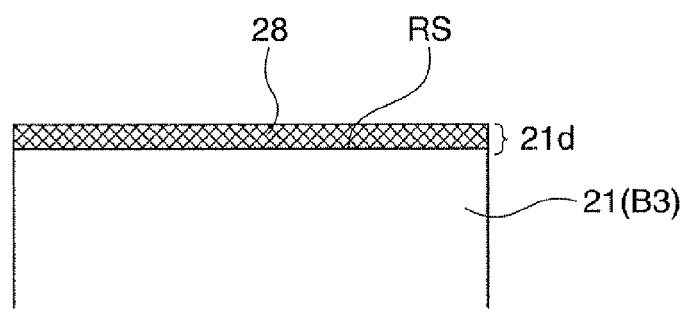
FIG. 3C is a diagram illustrating a structure of a fourth reflective surface in a light emission portion of the light guiding member.

The light emission portion B3 is a triangular prism-shaped portion, and has a light emission surface OS that is a part of the first reflective surface 21a and the fourth reflective surface 21d that is opposite to the light emission surface OS. The light emission surface OS is a front-side plane that emits the image light GL to the observer's eye EY, and is formed of a part of the first reflective surface 21a similarly to the light incidence surface IS, and extends in a direction orthogonal to the second optical axis AX2. A distance D between the second optical axis AX2 passing through the light emission portion B3 and the first optical axis AX1 passing through the light incidence portion B1 is set to, for example, 50 mm in consideration of the width of the observer's head, or the like. The fourth reflective surface 21d is a rectangular flat surface that reflects the image light GL, which is incident through the first and second reflective surfaces 21a and 21b, and emits this image light GL to the outside of the light emission portion B3, and has a half mirror layer 28 (see FIG. 3C). The half mirror layer 28 is formed by forming a film through a vapor deposition of Ag or the like on an inclined surface RS of the light guiding member 21. Reflectance of the half mirror layer 28 is set to, for example, 20%, and transmittance thereof is set to, for example, 80%. The fourth reflective surface 21d is inclined, for example, at an acute angle α of 25° to 27° with respect to the second optical axis AX2 or XY plane that is orthogonal to the first reflective surface 21a. The image light GL, which is incident through the first and second reflective surfaces 21a and 21b of the light guiding portion B2, is partially reflected by the fourth reflective surface 21d and is made to turn back so as to face the negative Z-direction as a whole, and thereby the image light GL passes through the light emission surface OS. In addition, the image light GL that is transmitted through the fourth reflective surface 21d is incident to the light transmitting member 23 and is not used for forming a video.

The light transmitting member 23 has the same refractive index as a main body of the light guiding member 21, and has a first surface 23a, a second surface 23b, and a third surface 23c. The first and second surfaces 23a and 23b extend along the XY plane. In addition, the third surface 23c is inclined with respect to the XY plane, and is disposed so as to be opposite to the fourth reflective surface 21d of the light guiding member 21 and in parallel therewith. The light transmitting member 23 is formed of a resin material showing a high light transmitting property at a visible range similarly to the light guiding member 21. The light transmitting member 23 is a member of a block state, which is integrally molded by injection molding, and is formed, for example, by injecting a thermal polymerization-type resin material into a metal mold and by thermally curing this molded resin material.

In the light transmitting member 23, the first surface 23a is disposed on an extended plane of the first reflective surface 21a provided to the light guiding member 21 and is located at a rear side close to the observer's eye EY, and the second surface 23b is disposed on an extended plane of the second reflective surface 21b provided to the light guiding member 21 and is located at a front side distant from the observer's eye EY. The third surface 23e is a rectangular transmissive surface that is bonded to the fourth reflective surface 21d of the light guiding member 21 by an adhesive.

The light transmitting member 23 and the light guiding member 21 make up a see-through portion B4 at a bonding portion of these members and in the vicinity of the bonding portion. That is, a reflective coat such as a mirror layer is not provided to the first and second surfaces 23a and 23b, such that these surfaces transmit the external light GL' with a high transmittance similarly to the light guiding portion B2 of the light guiding member 21. The third surface 23c may also transmit the external light GL' with high transmittance, but the fourth reflective surface 21d of the light guiding member 21 is provided with the half mirror layer 28, such that the external light GL' after passing through the third surface 23c is reduced, for example, by 20%. That is, an observer observes light in which the image light GL reduced to 20% and the external light GL' reduced to 80% overlap each other.

C. Outline of Optical Path of Image Light

FIG. 4A shows a diagram illustrating an optical path in the first direction D1 corresponding to a vertical cross-section CS1 of the liquid crystal display device 32. In the vertical cross-section along the first direction D1, that is, a YZ plane (a Y'Z' plane after being developed), in the image light emitted from the liquid crystal display device 32, a component, which is emitted from an upper end side (a positive Y side) of a display region 32b, indicated by a one-dotted line in the drawing is set as an image light beam GLa, and a component, which is emitted from a lower end side (a negative Y side) of a display region 32b, indicated by a two-dotted line in the drawing is set as an image light beam GLb.

The upper-side image light beam GLa is converted into a parallel light beam by the projective optical system 12, passes through the light incidence portion 31, the light guiding portion B2, and the light emission portion B3 of the light guiding member 21 along the developed optical axis AX', and is incident to the observer's eye EY from an upper-side direction inclined at an angle of $\phi_1$, in a parallel light beam state with respect to the observer's eye EY. On the other hand, the lower-side image light beam GLb is converted into a parallel light beam by the projective optical system 12, passes through the light incidence portion B1, the light guiding portion B2, and the light emission portion B3 of the light guiding member 21 along the developed optical axis AX', and is incident to the observer's eye EY from a lower side direction inclined at an angle of $\phi_2$ ($|\phi_2|=|\phi_1|$) in a parallel light beam state with respect to the observer's eye EY. The angles $\phi_1$ and $\phi_2$ correspond to an upper half angle of view and a lower half angle of view, respectively, and are set to, for example, 6.5°. In addition, the upper-side image light beam GLa and the lower-side image light beam GLb are incident to the observer's eye EY simultaneously instead of being incident to the observer's eye EY with a time interval.

FIG. 4B shows a diagram illustrating an optical path in the second direction (confinement direction or composite direction) D2 corresponding to a horizontal cross-section CS2 of the liquid crystal display device 32. In the horizontal cross-section CS2 along the second direction (confinement direction or composite direction) D2, that is, an XZ plane (an X'Z' plane after being developed), in the image light emitted from the liquid crystal display device 32, a component, which is emitted from a first display point P1 of a right end side (a positive X side) toward the display region 32b, indicated by a one-dotted line in the drawing is set as an image light beam GLc, and a component, which is emitted from a second display point P2 of a left end side (a negative X side) toward the display region 32b, indicated by a two-dotted line in the drawing is set as an image light beam GLd. In FIG. 4B, an image light beam GLe emitted from a right inner side and an image light beam GLf emitted from a left inner side are added for reference.

The image light beam GLc from the right-side first display point P1 is converted into a parallel light beam by the projective optical system 12, passes through the light incidence portion B1, the light guiding portion B2, and the light emission portion B3 of the light guiding member 21 along the developed optical axis AX', and is incident to the observer's eye EY from a right side direction inclined at an angle of $\theta_1$, in a parallel light beam state with respect to the observer's eye EY. On the other hand, the image light beam GLd from the left-side second display point P2 is converted into a parallel light beam by the projective optical system 12, passes through the light incidence portion B1, the light guiding portion B2, and the light emission portion B3 of the light guiding member 21 along the developed optical axis AX', and is incident to the observer's eye EY from a left-side direction inclined at an angle of $\theta_2$ ($|\theta_2|=|\theta_1|$) in a parallel light beam state with respect to the observer's eye EY. The angles $\theta_1$ and $\theta_2$ correspond to a left half angle of view and a right half angle of view, respectively, and are set to, for example, 10°. In addition, the upper-side image light beam GLc and the lower-side image light beam GLd are combined simultaneously and are emitted from the light emission portion B3. That is, the upper-side image light beam GLc and the lower-side image light beam GLd are incident to the observer's eye EY simultaneously instead of being incident to the observer's eye EY with a time interval.

In addition, in regard to the horizontal direction, that is, the second direction D2, the image light beams GLc and GLd are turned back by reflection inside the light guiding member 21 and the number of times of reflection of the image light beams GLc and GLd is different in each case, such that each of the image light beams GLc and GLd is discontinuously expressed in the light guiding member 21. Consequently, in regard to the horizontal direction, a screen is horizontally inverted as a whole, but as described later in detail, when the light guiding member 21 is processed with high accuracy, a right half image of the liquid crystal display device 32 and a left half image of the liquid crystal display device 32 are continuously combined without a gap or deviation. In addition, in consideration of the difference in the numbers of times of reflection of the image light beams GLc and GLd inside the light guiding member 21, the angle of emission $\theta_1'$ of the right-side image light beam GLc and the angle of emission $\theta_2'$ of the left-side image light GLd are set to be different from each other.

As described above, the image light beams GLa, GLb, GLc, and GLd that are incident to the observer's eye EY become virtual images from infinite distance, such that in regard to the first vertical direction D1, a video formed on the liquid crystal display device 32 is erected, and in regard to the second horizontal direction D2, a video formed on the liquid crystal display device 32 is inverted.

D. Optical Path of Image Light in Relation to Horizontal Direction

Figure 5:
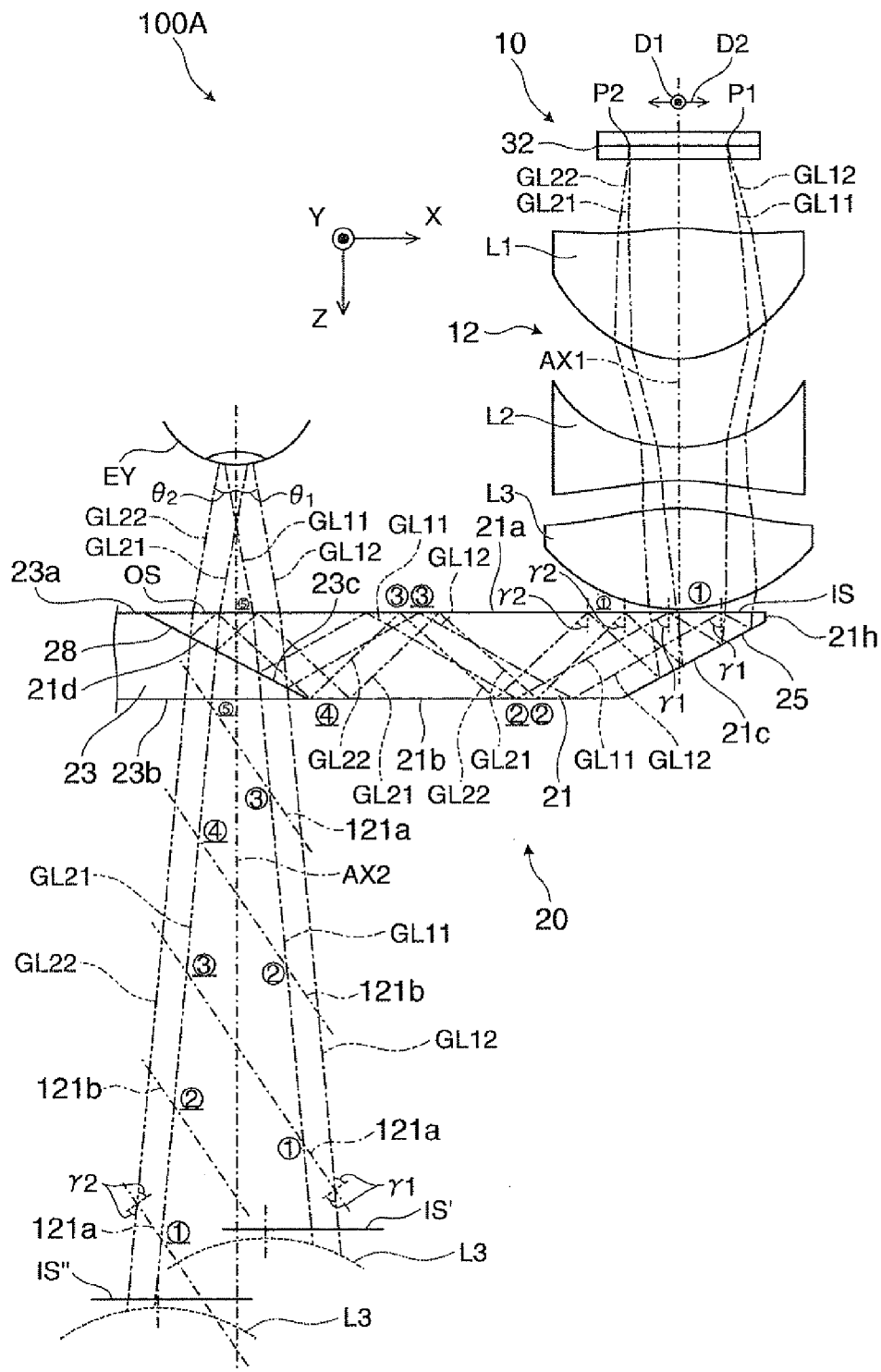
FIG. 5 is a plan view specifically illustrating an optical path in an optical system of a virtual image display device.

FIG. 5 shows a cross-sectional view illustrating a specific optical path in the first display device 100A. The projective optical system 12 includes three lenses L1, L2, and L3.

When passing through the lenses L1, L2, and L3 of the projective optical system 12, image light beams GL11 and GL12 from the right-side first display point P1 of the liquid crystal display device 32 are converted into parallel light beams, and are incident to the light incidence surface IS of the light guiding member 21. The image light beams GL11 and GL12 guided to the inside of the light guiding member 21 repeat a total reflection on the first and second reflective surfaces 21a and 21b at the same angle, and are eventually emitted from the light emission surface OS as a parallel light beam. Specifically, the image light beams GL11 and GL12 are reflected by the third reflective surface 21c of the light guiding member 21 as a parallel light beam, and then are incident to the first reflective surface 21a of the light guiding member 21 at a first reflection angle $\gamma_1$ and are totally reflected (total reflection of a first time). Then, the image light beams GL11 and GL12 are incident to the second reflective surface 21b while maintaining the first reflection angle $\gamma_1$ and are totally reflected (total reflection of a second time), and then are incident to the first reflective surface 21a again and are totally reflected (total reflection of a third time). As a result, the image light beams GL11 and GL12 are totally reflected by the first and second reflective surfaces 21a and 21b three times in total, and are incident to the fourth reflective surface 21d. The image light beams GL11 and GL12 are reflected by the fourth reflective surface 21d at the same angle as the third reflective surface 21c and are emitted from the light emission surface OS as a parallel light beam at an inclination of an angle $\theta_1$ with respect to the second optical axis AX2 direction that is orthogonal to the light emission surface OS.

When passing through the lenses L1, L2, and L3 of the projective optical system 12, image light beams GL21 and GL22 from the left-side second display point P2 of the liquid crystal display device 32 are converted into parallel light beams, and are incident to the light incidence surface IS of the light guiding member 21. The image light beams GL21 and GL22 guided to the inside of the light guiding member 21 repeat a total reflection on the first and second reflective surfaces 21a and 21b at the same angle, and are eventually emitted from the light emission surface OS as a parallel light beam. Specifically, the image light beams GL21 and GL22 are reflected by the third reflective surface 21c of the light guiding member 21 as a parallel light beam, and then are incident to the first reflective surface 21a of the light guiding member 21 at a second reflection angle $\gamma_2$ ($\gamma_2<\gamma_1$) and are totally reflected (total reflection of a first time). Then, the image light beams GL21 and GL22 are incident to the second reflective surface 21b while maintaining the second reflection angle $\gamma_2$ and are totally reflected (total reflection of a second time), are incident again to the first reflective surface 21a and are totally reflected (total reflection of a third time), are incident again to the second reflective surface 21b and are totally reflected (total reflection of a fourth time), and are incident again to the first reflective surface 21a and are totally reflected (total reflection of a fifth time). As a result, the image light beams GL21 and GL22 are totally reflected by the first and second reflective surfaces 21a and 21b five times in total and are incident to the fourth reflective surface 21d. The image light beams GL21 and GL22 are reflected by the fourth reflective surface 21d at the same angle as the third reflective surface 21c and are emitted from the light emission surface OS as a parallel light beam at an inclination of an angle θ2 with respect to the second optical axis AX2 direction that is orthogonal to the light emission surface OS.

In FIG. 5, a first virtual surface 121a corresponding to the first reflective surface 21a in a case where the light guiding member 21 is developed, and a second virtual surface 121b corresponding to the second reflective surface 21b in a case where the light guiding member 21 is developed are illustrated. Through such a development, it can be seen that the image light beams GL11 and GL12 from the first display point P1 pass through an incident equivalent surface IS' corresponding to the light incidence surface IS, pass through the first surface 121a two times, pass through the second surface 121b one time, are emitted from the light emission surface OS, and are incident to the observer's eye EY. In addition, it can be seen that the image light beams GL21 and GL22 from the second display point P2 pass through an incidence equivalent surface IS corresponding to the light incidence surface IS, pass through the first surface 121a three times, pass through the second surface 121b two times, are emitted from the light emission surface OS, and are incident to the observer's eye EY. In other words, the observer observes the lens L3 of the projective optical system 12 that is present in the vicinity of the two incidence equivalent surfaces IS' and IS" that are present at positions different from each other in an overlapped manner.

Figure 6A:
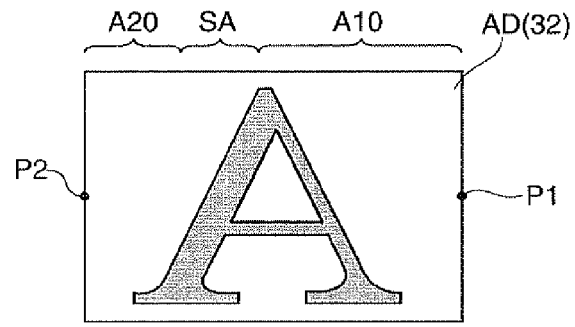
FIG. 6A is a diagram illustrating a display surface of a liquid crystal display device.
Figure 6B:
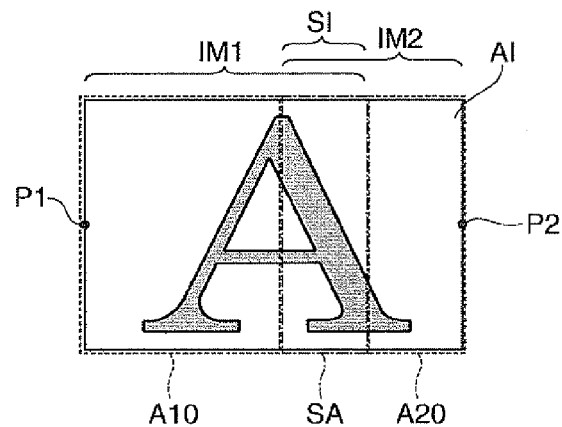
FIG. 6B is a diagram conceptually illustrating a virtual image of the liquid crystal display device, which is viewed by an observer.
Figure 6C:
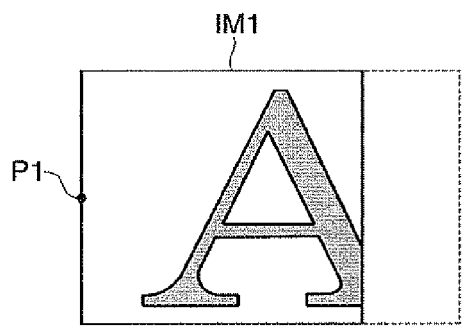
FIGS. 6C and 6D are diagrams illustrating two partial images making up the virtual image.
Figure 6D:
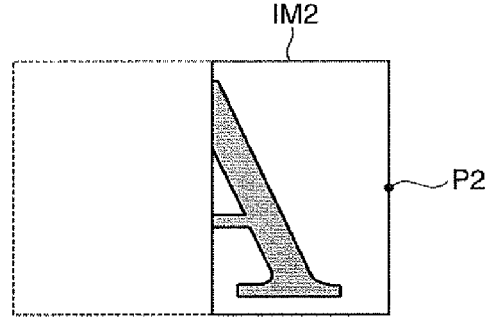

FIG. 6A shows a diagram conceptually illustrating a display surface of a liquid crystal display device 32, FIG. 6B is a diagram conceptually illustrating a virtual image of the liquid crystal display device 32, which is viewed to an observer, and FIGS. 6C and 6D are diagrams illustrating partial images making up the virtual image. A rectangular image forming region AD provided to the liquid crystal display device 32 shown in FIG. 6A is observed as a virtual image display region AI shown in FIG. 6B. A first projection image IM1 corresponding to a portion ranging from center to right-side in the image forming region AD of the liquid crystal display device 32 is formed at a left-side of the virtual image display region AI, and this first projection image IM1 becomes a partial image in which a right-side is deficient as shown in FIG. 6C. In addition, a second projection image IM2 corresponding to a portion ranging from center to left-side in the image forming region AD of the liquid crystal display device 32 is formed as a virtual image at a right-side of the virtual image display region AI, and this second projection image IM2 becomes a partial image in which a left half is deficient as shown in FIG. 6D. In this case, the first projection image IM1 shown in FIG. 6C and the second projection image IM2 shown in FIG. 6D are simultaneously incident to the observer's eye EY and simultaneously form an image.

A first partial region A10, which forms only the first projection image (virtual image) IM1 in the liquid crystal display device 32 shown in FIG. 6A, includes, for example, the first display point P1 of the right end of the liquid crystal display device 32 and emits the image light beams GL11 and GL12 that are totally reflected in the light guiding portion B2 of the light guiding member 21 three times in total. A second partial region A20, which forms only the second projection image (virtual image) IM2 in the liquid crystal display device 32, includes, for example, the second display point P2 of the left end of the liquid crystal display device 32 and emits the image light beams GL21 and GL22 that are totally reflected in the light guiding portion B2 of the light guiding member 21 five times in total. Image light from a band SA near the center of the image forming region AD of the liquid crystal display device 32, which is interposed between the first and second partial regions A10 and A20 and extends vertically, forms a superimposed image SI shown in FIG. 6B. That is, image light from the band SA of the liquid crystal display device 32 includes the first projection image IM1 formed by the image light beams GL11 and GL12 that are totally reflected in the light guiding portion B2 three times in total, and the second projection image IM2 formed by the image light beams GL21 and GL22 that are totally reflected in the light guiding portion B2 five times in total, and these first and second projection images IM1 and IM2 overlap each other on the virtual image display region AI. When the light guiding member 21 is accurately processed, and thereby a light beam that is accurately collimated by the projective optical system 12 is formed, it is possible to prevent variation or bleeding due to overlapping of the two projection images IM1 and IM2 with respect to the superimposed image SI. In addition, a horizontal width or an overlapping width of the band SA where the overlapping occurs may be adjusted by controlling an angle range of the illumination light SL that illuminates the liquid crystal display device 32. In this embodiment, the angle range of the illumination light SL is not particularly adjusted, such that the band SA of the horizontal width or the overlapping width that corresponds to a divergence characteristic of the backlight light-guiding portion 31b or the like is present.

Hereinbefore, the number of times of total reflection of the image light beams GL11 and GL12 emitted from the first partial region A10 including the first display point P1 of the right-side of the liquid crystal display device 32 by the first and second reflective surfaces 21a and 21b is set to three times in total, and the number of times of total reflection of the image light beams GL21 and GL22 emitted from the second partial region A20 including the second display point P2 of the left-side of the liquid crystal display device 32 by the first and second reflective surfaces 21a and 21b is set to five times in total, but the number of times of total reflection may be appropriately changed. That is, through an adjustment of external form (that is, the thickness t, the distance D, and acute angles α and β) of the light guiding member 21, the number of times of total reflection of the image light beams GL11 and GL12 may be set to five times in total, and the number of times of total reflection of the image light beams GL21 and GL22 may be set to seven times in total. In addition, hereinbefore, the number of times of total reflection of the image light beams GL11, GL12, GL21, and GL22 is an odd number, but when the light incidence surface IS and the light emission surface OS are disposed at an opposite side, that is, the light guiding member 21 is made to have a parallelogram shape in a plan view, the number of times of total reflection of the image light beams GL11, GL12, GL21, and GL22 becomes an even number.

E. Others

Figure 7A:
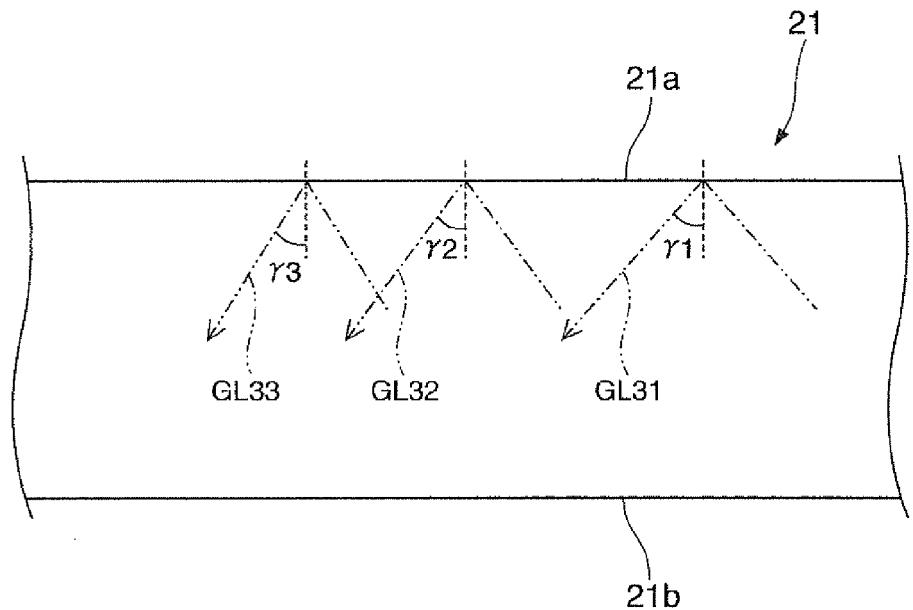
FIG. 7A is a diagram illustrating a light guiding state of image light in a modification.
Figure 7B:
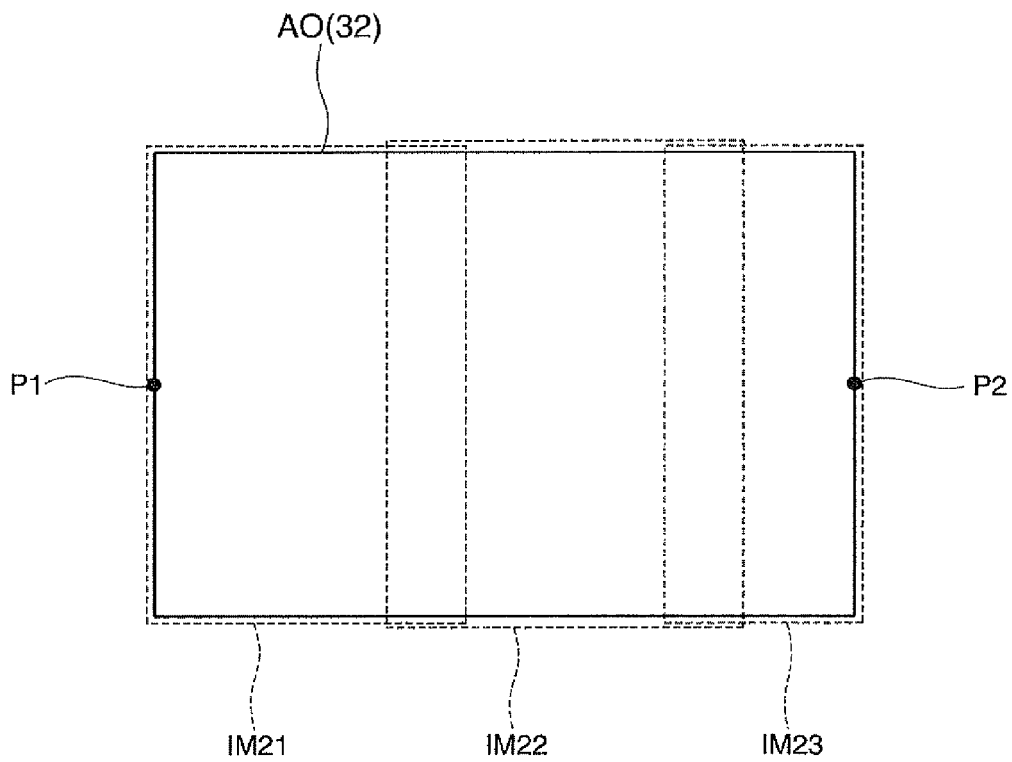
FIG. 7B is a diagram conceptually illustrating a virtual image of a liquid crystal display device in the modification.

FIG. 7A shows a diagram illustrating a modification of the light guiding member 21 shown in FIG. 2A and the like. In the above description, it is described that the image light that is propagated by the light guiding member 21 is totally reflected with respect to the first and second reflective surfaces 21a and 21b at two reflection angles γ1 and γ2, but similarly to the light guiding member 21 of the modification shown in FIG. 7A, three components of image light beams GL31, GL32, and GL33 may be permitted to be totally reflected at reflection angles γ1, γ2, and γ3 (γ1>γ2>γ3), respectively. In this case, the image light GL emitted from the liquid crystal display device 32 is propagated in three modes, and is combined at a position of the observer's eye EY and becomes a virtual image. In this case, as shown in FIG. 7B, a projection image IM21 subjected to the total reflection, for example, three times in total is formed at a left-side of the effective display region A0, a projection image IM22 subjected to the total reflection, for example, five times in total is formed near the center of the effective display region A0, and a projection image IM23 subjected to the total reflection, for example, seven times in total is formed at a right-side of the effective display region A0.

Figure 8:
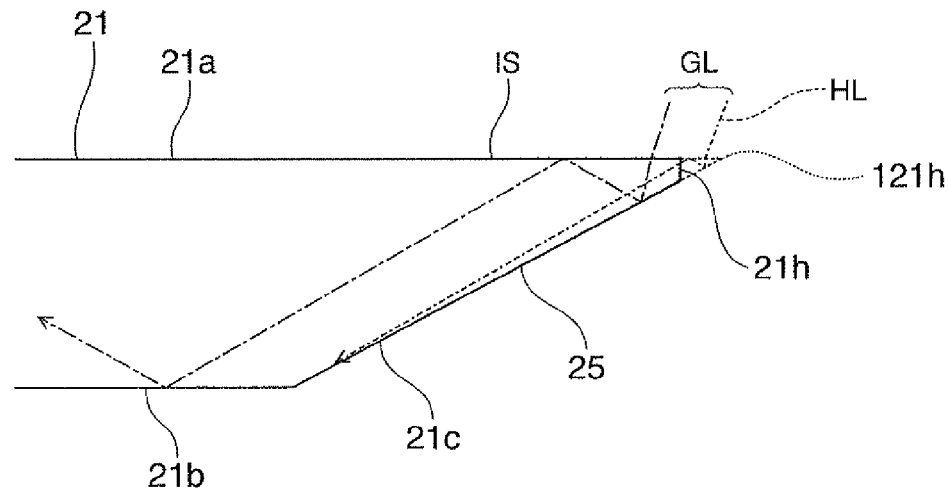
FIG. 8 is a diagram illustrating the reason why an end surface formed by removing a corner is provided to the light guiding member.

FIG. 8 shows an enlarged diagram illustrating the reason why an end surface 21h formed by removing a corner is provided to the light guiding member 21 shown in FIG. 2A or the like. The image light GL incident to a position near a corner 121h of the light guiding member 21 is reflected by the third reflective surface 21c and then is reflected by the first reflective surface 21a, but the image light GL is reflected by the first reflective surface 21a and then is reflected again by the third reflective surface 21c. This re-reflected light HL becomes consequentially undesirable ghost light, such that it is preferable to remove the re-reflected light HL in advance. Therefore, the corner 121h is removed to provide an end surface 21h so as to impose restrictions on the optical path.

Figure 9:
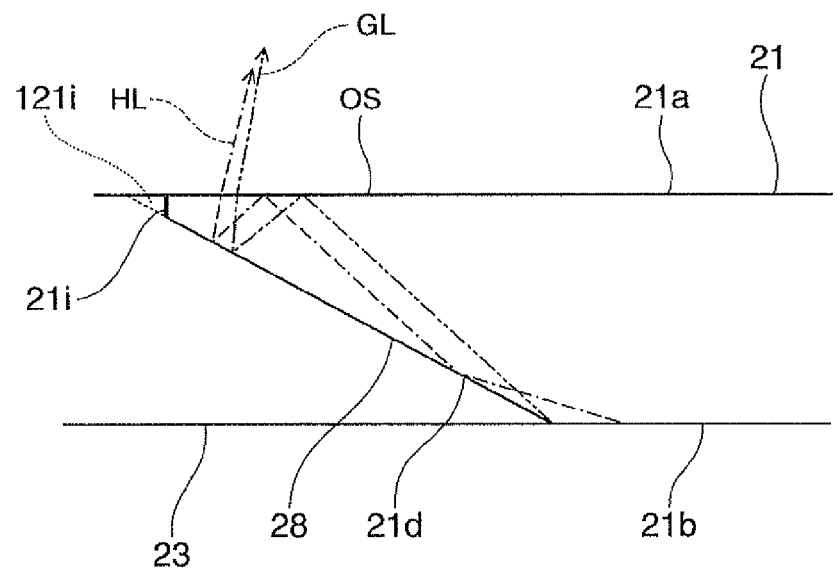

FIG. 9 shows an enlarged diagram illustrating a modification of the light guiding member 21 shown in FIG. 2A or the like. In this case, an end surface 21i, which is formed by removing a corner 121i, is provided to the fourth reflective surface 21d side of the light guiding member 21. That is, the light guiding member 21 has an external form of a polyhedral shape with eight faces. A coat or a roughened surface with, for example, a relatively high reflectance is formed on the end surface 21i, and a step difference that is fitted to the end surface 21i is also provided to the light transmitting member 23. By providing such an end surface 21i, it is possible to prevent the normal image light GL propagated through the light guiding member 21 from being reflected by the fourth reflective surface 21d two times or more, and being incident to the observer's eye EY as unnecessary light HL, or it is possible to prevent the unnecessary light HL that is image light passing through the light guiding portion B2 by the reflection less than three times from being reflected by the fourth reflective surface 21d two times or more and being incident to the observer's eye EY. As a result, it is possible to prevent the ghost light from being incident to the observer's eye.

In the above-described virtual image display device 100, the image light GL reflected by the third reflective surface 21c of the light incidence portion B1 is propagated while being totally reflected by the first and second reflective surfaces 21a and 21b of the light guiding portion, and is reflected by the fourth reflective surface 21d of the light emission portion B3 and is incident to the observer's eye EY as a virtual image. At this time, the number of times of reflection of the first image light beams GL11 and GL12, which are emitted from the first display point P1 of the image display device 11, at the light guiding portion, and the number of times of reflection of the second image light beams GL21 and GL22, which are emitted from the second display point P2 of the image display device 11, at the light guiding portion B2, are different from each other, such that it is possible to take a wide angle width of an angle of emission of the image light GL emitted from the light emission portion B3. That is, it is possible to take in the image light GL from the different partial regions A10 and A20 in the image display device 11 at a relatively wide angle of view, such that it is possible to secure a large display size of a virtual image that is observed over the light emission portion B3. In this way, due to the setting of a structure in which image light beams GL in which the numbers of times of reflection are different from each other are taken out, it is possible to make the light emission portion B3 large so as to cover a pupil without making the light guiding portion B2 too much thicker, and therefore it is not necessary to perform a pupil division by making the light emission portion B3 close to the pupil. As a result, it is possible to secure a large Eyring diameter and thereby a preferable see-through observation may be realized.

Hereinbefore, the invention is described based on the embodiment, but the invention is not limited to the embodiment, and may be executed with various aspects without departing from the scope of the invention. For example, the following modifications may be made.

In the above-described embodiment, the illumination light SL from the illumination device 31 is made not to have a particular directivity, but the illumination light SL may have a directivity according to a position of the liquid crystal display device 32. According to this configuration, it is possible to effectively illuminate the liquid crystal display device 32 and thereby it is possible to reduce a variation in brightness due to a position of the image light GL.

In the above-described embodiment, a display brightness of the liquid crystal display device 32 is not particularly adjusted, but the display brightness may be adjusted according to a range or a superimposition of the projection images IM1 and IM2 as shown in FIG. 6B.

In the above-described embodiment, the reflectance of the half mirror layer 28 provided on the fourth reflective surface 21d is set to 20% and thereby priority is given to the see-through state, but the reflectance of the half mirror layer 28 is set to 50% or more and thereby priority may be given to the image light. In addition, in a case where it is not necessary to allow the external image to be observed, optical reflectance of the fourth reflective surface 21d may be substantially 100%. In addition, the half mirror layer 28 may not be formed on the entirety of the fourth reflective surface 21d, and may be formed at a necessary partial region. In addition, the half mirror layer 28 may be formed on the third surface 23c of the light transmitting member 23.

In the above-described embodiment, the transmission-type liquid crystal display device 32 or the like is used as the image display device 11, but as the image display device 11, various devices may be used without being limited to the transmission-type liquid crystal display device 32. For example, a configuration using a reflective liquid crystal display device is possible, and a digital micro mirror device or the like may be used instead of the liquid crystal display device 32. In addition, as the image display device 11, a self-luminescent device represented by an LED array, an OLED (organic EL), or the like may be used.

The virtual image display device 100 of the above-described embodiment is configured to have a pair of image forming device 10 and light guiding device 20 in correspondence with each of a right eye and a left eye, but the virtual image display device 100 may be configured to have the image forming device 10 and the light guiding device 20 provided to either the right eye or the left eye to view an image with one eye.

In the above-described embodiment, the first optical axis AX1 passing through the light incidence surface IS and the second optical axis AX2 passing through the light emission surface OS are parallel with each other, but these optical axes AX1 and AX2 may not be parallel with each other.

In the above description, the virtual image display device 100 is specifically described as a head-mounted display, but the virtual image display device 100 may be modified as a head-up display.

In the above description, in regard to the first and second reflective surfaces 21a and 21b, image light is totally reflected by an interface with air and is guided without forming a mirror, a half mirror, or the like on the surface, but the total reflection of the invention includes a reflection that occurs in a state where a mirror coat or a half mirror film is formed on the entirety of the first and second reflective surfaces 21a and 21b or a part thereof. For example, the total reflection of the invention includes a case where an angle of incidence of image light satisfies a total reflection condition, the mirror coat or the like is formed on the entirety of the first and second reflective surfaces 21a and 21b or a part thereof and thereby substantially all of the image light beams are reflected. In addition, as long as sufficiently bright image light is obtained, the entirety of the first and second reflective surfaces 21a and 21b or a part thereof may be coated with a more or less transmissive mirror.

In the above description, the light guiding member 21 extends in the horizontal direction that is parallel with the eye EY, but the light guiding member 21 may extend in the vertical direction. In this case, the optical panel 110 has a parallel configuration in parallel not in series.

What is claimed is:

1. A virtual image display device, comprising:
   an image display device that emits image light;
   a projective optical system that allows the image light emitted from the image display device to be incident; and
   a light guiding member, comprising:
     a light guiding portion;
     a light incidence portion that allows the image light to be incident to the light guiding portion; and
     a light emission portion that emits the image light guided by the light guiding portion to the outside, and that makes the image light visible through the light emission portion,
   the light guiding portion having a first reflective surface and a second reflective surface that are disposed in parallel with each other and allow the light beam to be guided through a substantially total reflection,
   the light incidence portion having a third reflective surface that makes a predetermined angle with respect to the first reflective surface,
   the light emission portion having a fourth reflective surface that makes a predetermined angle with respect to the first reflective surface,
   the image light from the image display device being guided into the light guiding member with a number of times of reflection that is different in each image light beam, and a plurality of image light beams formed in correspondence with the number of times of reflection are combined through the light emission portion and are emitted to the outside, and
   the light guiding member being configured to increase a width of an angle of emission of the image light emitted from the light emission portion.

2. A virtual image display device, comprising:
   an image display device that forms image light;
   a projective optical system that allows the image light emitted from the image display device to be incident; and
   a light guiding member, comprising:
     a light guiding portion;
     a light incidence portion that allows the image light to be incident to the light guiding portion; and
     a light emission portion that emits the image light guided by the light guiding portion to the outside, and that makes the image light visible through the light emission portion,
   the light guiding portion having a first reflective surface and a second reflective surface that are disposed in parallel with each other and allow light to be guided through a substantially total reflection,
   the light incidence portion having a third reflective surface that makes a predetermined angle with respect to the first reflective surface,
   the light emission portion having a fourth reflective surface that makes a predetermined angle with respect to the first reflective surface, and
   the number of times of reflection of a first image light beam, emitted from a first partial region, which forms a first projection image in the image display device, in the light guiding portion, and the number of times of reflection of a second image light beam, emitted from a second partial region, which forms a second projection image in the image display device, different from the first partial region in regard to a confinement direction in which a return of an optical path due to reflection occurs at the time of light-guiding, in the light guiding portion, being different from each other.

3. The virtual image display device according to claim 2, the confinement direction being a direction that is parallel with a cross-section including a first optical axis passing through the projective optical system and a normal line of the third reflective surface.

4. The virtual image display device according to claim 1, the third reflective surface and the fourth reflective surface making an acute angle of 45° or less with respect to the first reflective surface, respectively.

5. The virtual image display device according to claim 4, the third reflective surface and the fourth reflective surface making the same angle with respect to the first reflective surface.

6. The virtual image display device according to claim 5, the first optical axis passing through the projective optical system and a second optical axis of the image light emitted from the light emission portion being parallel with a normal line of the first reflective surface, respectively.

7. The virtual image display device according to claim 1, the light guiding member including the light guiding portion, the light incidence portion, and the light emission portion being an integrally formed member of a block state.

8. The virtual image display device according to claim 7, the light guiding member having the first to fourth reflective surfaces as a side surface, and a top surface and a bottom surface that are adjacent to the first to fourth reflective surfaces, respectively.

9. The virtual image display device according to claim 6, the light guiding member having an external form of a polyhedral shape with at least one of a first end surface provided by removing a corner between the first reflective surface and the third reflective surface, and a second end surface provided by removing a corner between the first reflective surface and the fourth reflective surface.

10. The virtual image display device according to claim 1, the light guiding member being integrally molded by injection molding.

11. The virtual image display device according to claim 10, the light guiding member being molded from a thermal polymerization type resin material.

12. The virtual image display device according to claim 1, the light guiding member comprising a hard coat on the first reflective surface and the second reflective surface.

13. The virtual image display device according to claim 1, further comprising:
  a wedge-shaped light transmitting member that has a transmissive surface that is opposite to the fourth reflective surface; and
  a half mirror provided on the fourth reflective surface.

14. The virtual image display device according to claim 13, the half mirror having a transmittance that is adjusted by controlling a film thickness of an Ag film.

15. The virtual image display device according to claim 1, the third reflective surface being provided with a substantially total reflection coating.

16. A virtual image display device, comprising:
  an image display device that emits a plurality of image light beams;
  a projective optical system that allows the image light emitted from the image display device to be incident; and
  a light guiding member, comprising:
    a light guiding portion; and
    a light incidence portion that allows the image light to be incident to the light guiding portion, and a light emission portion that emits the image light guided by the light guiding portion to the outside, and that makes the image light visible through the light emission portion,
    the light guiding portion having a first reflective surface and a second reflective surface that are disposed in parallel with each other and allow light to be guided through a substantially total reflection,
    the light incidence portion having a third reflective surface that defines an opening width and makes a predetermined angle with respect to the first reflective surface,
    the light emission portion having a fourth reflective surface that makes a predetermined angle with respect to the first reflective surface,
    each of the plurality of light beams being propagated in three different modes and substantially totally reflected at a different reflection angle such that a first reflection angle of the plurality of light beams is greater than a second reflection angle of the plurality of light beams, and the second reflection angle being greater than a third reflection angle of the plurality of light beams, and
    the light guiding member being configured to increase a width of an angle of emission of the image light emitted from the light emission portion.

17. The virtual image display device according to claim 16, the plurality of light beams being subject to a substantially total reflection of three, five and seven times, each forming a projection image at a left-side, center and right-side of an effective display region.

* * * * *